May 30, 1933.  J. H. MORROW  1,911,235
WEIGHING APPARATUS
Filed Jan. 8, 1932    3 Sheets-Sheet 1

INVENTOR
J. H. MORROW
BY
ATTORNEYS

Fig. 7

Patented May 30, 1933

1,911,235

UNITED STATES PATENT OFFICE

JOSEPH H. MORROW, OF HOKENDAUQUA, PENNSYLVANIA, ASSIGNOR TO FULLER COMPANY, OF CATASAUQUA, PENNSYLVANIA, A CORPORATION OF DELAWARE

WEIGHING APPARATUS

Application filed January 8, 1932. Serial No. 585,481.

This invention relates to batch weighing apparatus, and more particularly to an apparatus for withdrawing a batch or series of batches of predetermined weight of pulverized or finely divided materials from a storage bin or other source of supply, and discharging the batch into any suitable receptacle. The operations of withdrawing and discharging the batch are effected by automatic and remote control, the actual operation of weighing being out of the operator's control to avoid errors and also to prevent tampering with the desired weight.

The invention will be specifically described in connection with its use in the batching of bulk Portland cement for concrete mixing, but it is to be understood that it is equally applicable to the measuring of quantities of other bulk materials, which can be handled by mechanical feeders.

As is well understood in this art, dry pulverized materials, such as Portland cement, become fluent and behave similarly to liquids when mixed with air. This condition may develop in storage bins when arches or slides fall, or when materials are delivered into an empty bin. In this condition the flow of materials is very hard to control, as they will run through openings of very small size, including the flights of screw feeders and the like. When discharged from a container, air is usually absorbed to an extent that the materials will splash and flow, unless proper precautions are taken to restrain them.

In accordance with modern practice, when concrete mixtures are carefully designed in proportions by weight of cement, sand, aggregates and water, it will be evident that the cement-water ratio, particularly, may be affected by an excess or deficiency in cement with relation to the predetermined weight. It is obvious that underweights of cement impair the strength of the concrete and equally obvious that overweights will involve an accumulation of losses to the contractor in addition to disturbing the mixture.

In accordance with my invention, a continuous series of batches may be discharged from the apparatus, the weight of which will be uniform within the proper limits, provision being made to prevent the discharge of batches varying in weight above or below the desired limits. The arrangement is such that the operator's sole function is to start and discharge the apparatus for each batch, it being impossible for him to discharge the apparatus prematurely as well as after an excessive quantity of cement has been delivered to it.

Provision is also made to prevent excessive discharges of material, either due to flooding or over-running of the apparatus, due to accidental causes.

In general, my invention comprises a mechanical feeder which delivers cement to a batch hopper supported from a beam scale mechanism, the hopper being discharged by a gate, preferably having a double seal, together with the necessary drive mechanism and control circuits to perform the functions described above, and to be described more specifically hereinafter.

The feeder for withdrawing cement is of a non-flooding, measuring type, such as that disclosed in my Patent No. 1,900,458, granted March 7, 1933; the upper flange of which is secured to the bottom flange of any suitable storage receptacle for cement. The feeder is driven preferably by an electric motor through speed reduction gearing, and brake mechanism is provided to cause the feeder to stop almost instantly when a desired quantity of cement has been withdrawn. The batch hopper is suspended below the feeder, and may be supported from the latter on the lever elements of a double beam scale, which may likewise be supported on the casing of the feeder. In order to avoid a dust nuisance and loss of cement, a connection is preferably made between the lower flange of the feeder and the upper flange of the batch hopper by an apron of canvas or other suitable flexible material.

The bottom of the batch hopper is closed preferably by a rotary gate valve having a double seal. The gate valve is arranged to be driven through a speed reduction mechanism so that the operator can cause it to open slowly to prevent the cement from discharging as a mass, particularly when the cement is to be discharged into containers on motor trucks, for supplying highway pavers. Immediate discharge of cement may cause the latter to absorb air and splash or flow out of the container.

The scale is preferably of the double beam type, the tare beam serving to balance the weight of the apparatus and to prevent closing of the discharge gate until all of the cement has been discharged in a manner to be described hereinafter. The weigh beam obviously permits the regulation of the batch weight within the limits of the scale.

A tell-tale dial of any suitable springless type is provided to indicate to the operator that the apparatus is functioning properly, and to inform him when the hopper is empty.

When the apparatus is initially placed in service, the individual responsible for the proper predetermined weight adjusts the tare beam to balance and moves the poise on the balance beam to the desired indicated weight. A cover may then be placed over the scale and locked in place, to prevent interference with the apparatus by the operator.

The function of the apparatus is briefly as follows: After the scale has been adjusted as described above, the operator closes a remote control switch which may be and hereinafter will be referred to as a push button switch, which completes the proper electric circuits to the motor which drives the hopper discharge gate. As soon as this gate starts to close, it cannot be reopened, but continues to its closed position. The gate driving mechanism moves switches in several control circuits, one of which releases the brake on the feeder motor shaft, another causes the engagement of a brake on the driving shaft of the motor which drives the gate to prevent over-running of the latter. The feeder motor cannot then be stopped by the operator until the desired quantity of cement less the amount in suspension between the feeder and the hopper has been withdrawn from storage.

It will be evident that before the weigh beam comes to balance, provision must be made to compensate the apparatus for the cement falling in suspension from the roll to the batch hopper and the additional cement which will be withdrawn due to over-running of the roll. This latter quantity is the result of the lag of the feeder brake and the elements of the control circuits. Provision for this is made by a mercury type switch, which is tilted to an angle to cause it to open the driving circuits. The angle of the switch is determined by trial and error. This is accomplished usually within six trials under the automatic control. For instance, for an apparatus designed to meet the cement requirements of a one-yard mixer, such as a road paver, and assuming a desired weight of 658 pounds, which is common, the quantity of cement to be compensated for will usually be about 75 pounds. It will be understood that this is also dependent upon the size and speed of the roll, and it is accordingly based on a speed of 28 R. P. M., commonly employed, to suit the time requirements of highway cement batching.

The allowable variation above or below the predetermined batch is usually 1% by weight, and from the example set forth above, it will be evident that the excess or deficiency must not exceed 6.58 pounds. I accordingly prefer to adjust the apparatus, through switches to be described later, so that the hopper gate cannot be opened if more or less than 5 pounds, for this example, have been withdrawn. Assuming that the weight is exact and the apparatus is stopped, the operator may then move a push button switch, which controls circuits which reverse the motor operating the gate valve. The gate may be partly opened to cause the cement to run out slowly, but must be completely opened before it can be closed to insure complete discharge of cement.

The circuits are accordingly arranged to prevent closing until the full open position has been reached. This is accomplished by holding the push button switch in the closed position. As the gate reaches the full open position, a circuit is completed through an electro-magnetic vibrator, which causes any cement retained on the walls of the hopper or gate to discharge freely. This operation is manual, and the operator may stop the operation of the vibrator when the tell-tale dial has indicated that the hopper is in balance. Circuits are then completed to permit him to close the gate. The movement of the gate described above resets the control switches to permit the apparatus to be started in the manner described above.

Foreign materials, such as tramp iron, will normally discharge through the feeder, but should a large piece be engaged by the discharge device as the feeder stops, so that the starting torque is too great for the motor, a reversing switch is provided to permit the operator to run the feeder in the opposite direction, so that its inertia will ordinarily cause the foreign material to pass through harmlessly. Should the foreign material force the sealing elements of the feeder to open position, as the latter stops under the automatic control, and should a slide of aerated cement flood through the opening thus provided, the operator cannot discharge the hopper until the excess cement has been removed.

The apparatus may be installed, for example, under any suitable storage bin, such as a portable tank supported on columns, through which batching trucks may pass. The apparatus is ordinarily enclosd in a casing, to prevent manipulation of the apparatus, only the tell-tale dial and the opening and closing switches being exposed. At the lower end of the casing, connection is usually made through any suitable flexible spout to deliver the cement to the containers or receptacles carried by the trucks. No further description of the casing or storage bin will be made, as they form no part of the present invention.

For a more complete understanding of the invention, reference is made to the accompanying drawings, in which.

Figures 1, 3, 4:
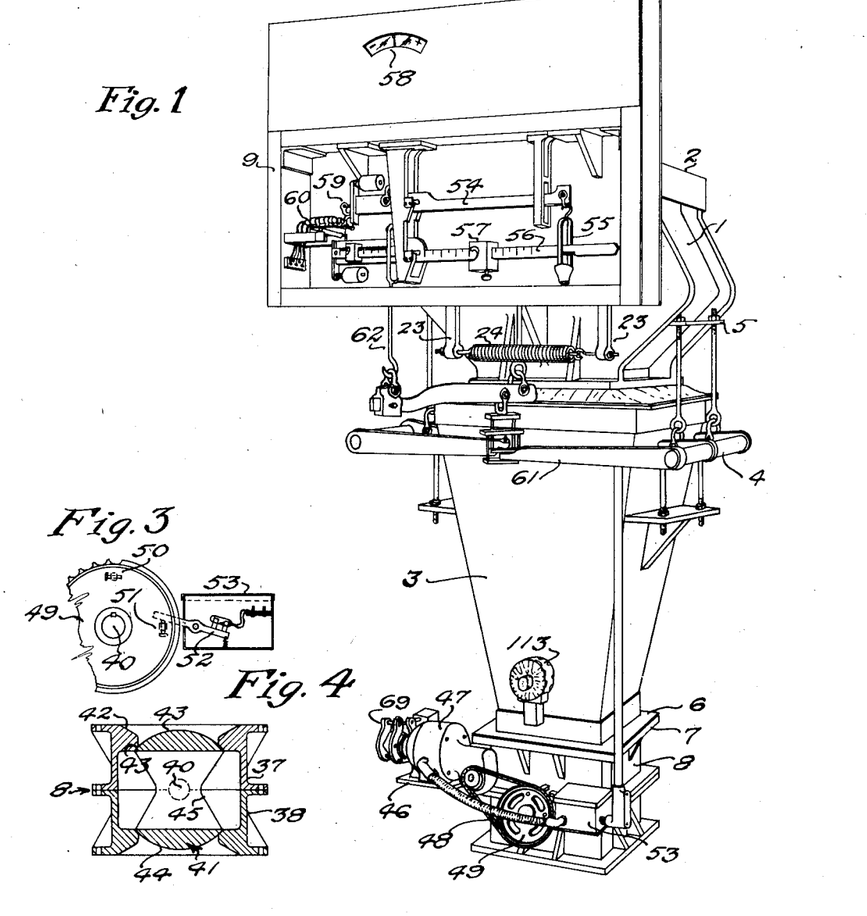
Fig. 1 is a front elevation of the apparatus in perspective, with the cover removed from the scale box.
Fig. 3 is a fragmentary detail of the discharge gate inter-lock switch mechanism.
Fig. 4 is a cross-sectional detail of the discharge gate.
Figures 2, 5, 6:
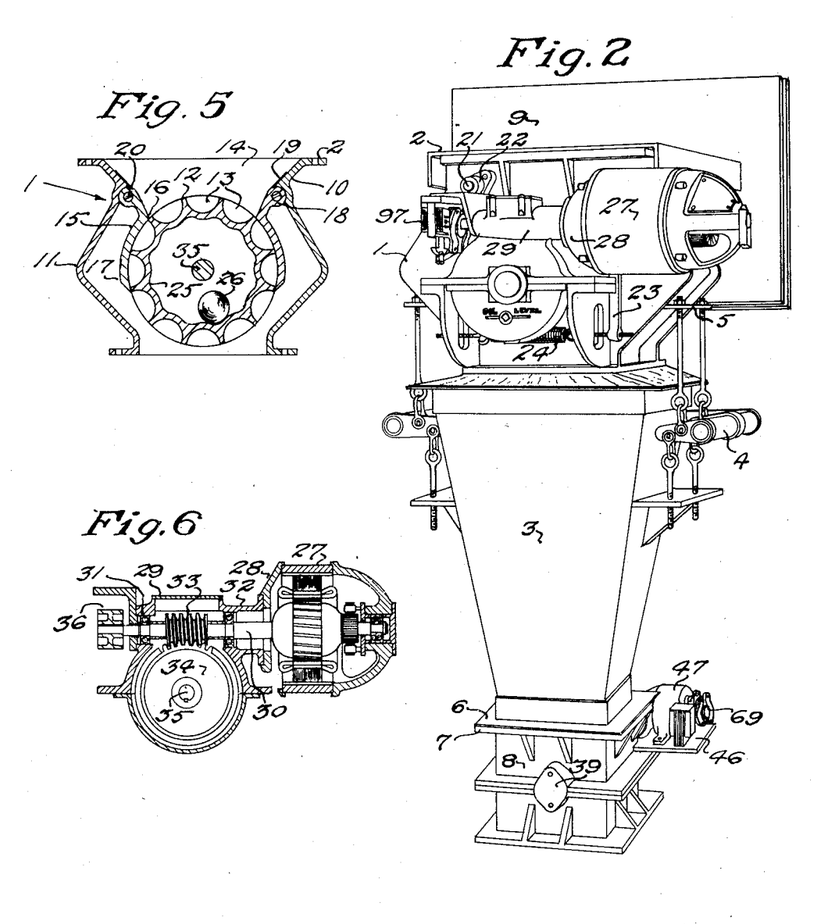
Fig. 2 is a rear view of opposite perspective.
Fig. 5 is a cross-sectional detail of the feeder.
Fig. 6 is a cross-sectional detail of the feeder driving motor and speed reducer.

Referring to the drawings, and first to Figs. 1, 2 and 5, the apparatus will be seen to consist of a mechanical feeder 1, having an upper flange 2, which may be secured to any suitable cement storage bin (not shown). A batch hopper 3 is supported by lever elements of the scale, indicated generally at 4, the latter being conveniently supported from brackets 5 on the feeder casing or any other suitable stationary support. The bottom of the hopper is flanged, as at 6, and secured to the upper flange 7 of a discharge gate 8.

Likewise secured to the casing of the feeder or any other convenient support is the scale box 9, illustrated in Fig. 1, with the cover removed to show the elements to be described hereinafter.

The cement withdrawal and measuring feeder 1 is preferably of a non-flooding type, as disclosed more particularly in my patent above identified, and comprises, as shown in Fig. 5, a casing 10 having outwardly flared side walls 11, and a feed roll 12, provided with pockets or flutes 13 to withdraw measured quantities of cement from the hopper section 14. The flutes are scraped to a flat level by follower plates 15, having sharp leading edges 16, designed to prevent packing or wedging of the cement in the flutes 13. The follower plates have a curved portion 17 conforming to the curvature of the roll and preferably covering at least two pockets or flutes 13, to cause the material in the pockets to seal the feeder against flooding of aerated cement in the direction of rotation.

The upper ends of the follower plates are partly cylindrical in cross-section, as shown at 18, to fit into a corresponding groove in the side walls 11, to form a relatively tight joint, which is protected against the entrance of cement by plates of spring steel 19, secured to the walls of the hopper 14, and which bear against the curved portion of the follower plates. Each plate 15 is fixed to a transverse shaft 20, the shafts extending through opposite walls of the casing, as indicated at 21 in Fig. 2, where they are secured to crank arms 22, the lower ends 23 of which are held in a normally inward position by a spring 24. It should be understood that the follower plates need not be in actual metal-to-metal contact with the roll, but may be held slightly out of engagement by any suitable fixed stop; for instance such as that shown in my patent above mentioned.

It will be noted that the feeder is symmetrical in design, so that it may be caused to run in either direction, the purpose of this being to permit it to discharge tramp iron or other foreign material of reasonable size, which may be deposited in a pocket 13, to near the leading edge 16 of the follower plate to permit the latter to move outwardly when the roll is started, the power of the motor being insufficient for the purpose. Under such conditions the roll may be reversed, and the torque of the motor in addition to the inertia of the roll ordinarily will cause the opposite follower plate to swing outwardly to discharge the foreign matter.

The roll 12 is preferably made of steel of relatively thin section, and the inner surface is provided with corresponding flutes 25, to form an irregular surface, and one or more balls 26 bouncing from one flute to another will vibrate the pockets or flutes 13 sufficiently to cause the material to discharge freely.

As will be particularly noted from Figs. 2 and 6, the feeder driving motor 27 has a front end-bell 28, secured to a housing 29, enclosing speed reduction gearing. The motor shaft 30 is extended and supported in suitable bearings 31 and 32, between which a worm gear 33 is arranged to drive a worm wheel 34, keyed to the feeder shaft 35. Beyond the bearing 31, the motor shaft 30 is extended and is provided with a drum 36 of a spring and solenoid operated brake of conventional type, the function of the brake being to stop the further movement of the roll when the desired quantity of cement has been withdrawn.

The hopper discharge gate and its associated parts comprise the following elements, reference being made particularly to Figs. 2 and 4: The casing of the gate comprises an upper flange section 37 and a complementary lower section 38. Each is provided with one-half of a bearing 39, for the trunnion shafts 40 of a rotor 41. The inlet and outlet of the gate are identical, and comprise inwardly sloping walls 42, provided with curved sections at 43, conforming to the curvature of the sealing elements 43 and 44 of the rotor. It will be noted that when the rotor is in the open position, a free passageway is provided clear of shafting or other obstacles to the free flow or discharge of cement from the hopper 3.

The ends of the roll are formed with a V shape, as indicated at 45, to cause the latter to move freely in either direction. The purpose of providing two sealing elements is first to prevent leakage and secondly to cause the cement or other material to be diverted in its course through the gate when it is initally opened, to prevent a rush or flood of cement into the receiving receptacle.

Referring to Fig. 1, it will be noted that a bracket 46 is supported on a flange of the gate 8, and supports the driving motor 47, which turns the rotor 41 through any suitable speed reduction means, such as the chain and sprockets indicated generally at 48. The larger sprocket 49, reference being made to Fig. 3, is provided with adjustable stops 50 and 51, which move two pivotally mounted supports 52 only one of which is shown upon each of which a bank of three mercury type switches, forming a part of the interlocking circuits, to be described hereinafter, are mounted. This mechanism may be enclosed in a suitable container 53, and will be described in detail with reference to the wiring diagram, Fig. 7.

The elements of the scale are of conventional type, and comprise a tare beam 54, provided with a loop 55, engaging the end of the weigh beam 56, the latter being provided with the usual poise 57. A tell-tale, comprising the usual dial and index, indicated generally at 58, may be of any conventional springless type, its function being solely to indicate to the operator when the hopper 3 is completely empty and the tare beam 54 in balance, as the beam elements of the scale are normally covered during operation.

Linkage, generally indicated at 59, attached to the tare beam 54, serves to actuate the support 60 for a plurality of mercury type switches, the function of which will be described in connection with Fig. 7.

The lever elements of the scale, which support the batch hopper 3, are indicated generally at 61, and being of conventional type require no detailed description. Connection between the lever elements and the scale beams is made through the usual link 62.

Figure 7:
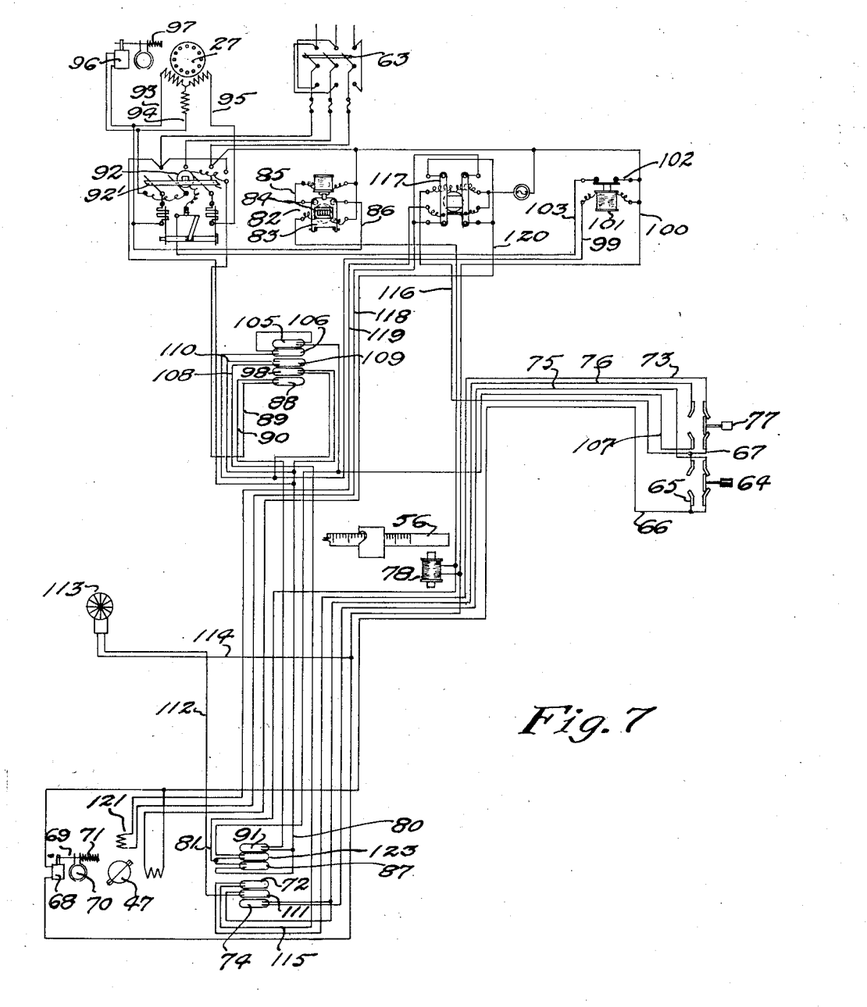
Fig. 7 is a wiring diagram of the control and interlock circuits.

The control and interlocking electrical circuits which cause the apparatus to function in the manner described above will best be understood by reference to Fig. 7 in which the elements of the apparatus are shown pictorially. Power is supplied through the usual feeders of a 3 phase circuit to a reversing switch 63. Assuming that the batch hopper 3 is empty, at the initial starting of the apparatus, the tare beam 54 is balanced and the rotor 41 of the gate 8 is open; that is, the position in which it is turned 90 degrees from that illustrated in Fig. 4, movement of the closing switch or push button 64 to close the contacts 65 completes a circuit through wires 66 and 67 to the gate driving motor 47 and at the same time it energizes the solenoid 68 of the brake 69 which surrounds a brake drum 70 secured to the shaft of the motor 47. A spring 71 forms one of the brake elements, causing the brake to be operative when circuit through lines 66 and 67 is open, but when this circuit is completed the solenoid 68 disengages the brake and the motor 47 is started to close the gate. This brake is of conventional design and needs no further description.

When the motor 47 has driven the rotor 41 of the gate valve 8 to the closed position indicated in Fig. 4, two banks of switches in the housing 53 are moved by the stop 51 on the sprocket 49. Among these mercury type switches is a limit switch 72 which is thus opened to break the circuit represented by the lines 66, 67 and 73, thereby stopping motor 47 and causing the spring 71 to engage the brake on the brake drum 70 and thereby stopping further movement of the discharge gate rotor 41. At the same time a switch 74 is closed, partially completing a circuit represented by lines 75 and 76, this circuit also including a push button switch 77 which controls the opening of the bin gate 8 later on in the sequence of operation as will be described hereinafter.

At this initial starting time the weigh beam 56 is held out of contact with the loop 55 of the tare beam 54 by means of a solenoid 78, the core of the solenoid moving upwardly to hold the weigh beam in this position. The solenoid is energized by the switch 87 which completes the circuit through feeder 80 and line 81. Line 81 continues and energizes the magnet of a mechanical lock-in relay indicated generally at 82, forming a part of a counting means for the batches; the front plate 83 forms an armature on which the mechanical counting device indicated generally at 84 is mounted. The movement of the armature 83 closes two contacts in a circuit comprising the lines 85 and 86 to a power supply to be described later.

Movement of the switch 87 in the upper bank of the two groups of three switches each shown at the bottom of the diagram opens the circuit through the solenoid 78, thereby releasing the weigh beam 56 which falls in the loop 55 of the tare beam, unbalancing the latter and thereby moving an entire bank of mercury switches on the support 60, this bank including a switch 88 which closes a circuit through the lines 89 and 90, the circuit also including the switch 91 in the lower bank which was initially moved into closed position. The circuit is now completed through the holding coil 92 of a 3 pole magnetic switch 92', the closing of the latter energizing the motor 27 through lines 93, 94 and 95. At the same time branches of the lines 93 and 94 energize a solenoid indicated at 96 to release a spring operated brake 97 of a similar but larger type than that previously described and which engages the drum 36 indicated in Fig. 6 on shaft 30 of the feeder driving motor 27. The motor 27 continues to run the feeder to deliver material to the batch hopper 3, but is stopped shortly before the maximum weight of material is deposited in the hopper, in order to compensate for material in suspension falling from the feeder to the mass actually in the weigh hopper and influencing the operation of the scale elements.

Stopping of the motor 27 of the feeder 1 is accomplished as follows: The bank of switches mounted on the support 60, and actuated by the movement of the tare beam 54 includes a switch 98. This switch completes a circuit through line 99, which is an extension of feeder 80 and line 100, through a normally closed relay 101 shown at the upper right hand of the diagram, the latter opening a circuit through the line 102 and the line 103 and releasing the holding coil 92, thus opening the motor circuits represented by the lines 93, 94 and 95 together with the circuit of the solenoid 96 which causes the brake 97 to engage.

As the scale beam starts to move toward the position of balance considerably before the weight of material deposited in the hopper equals the weight corresponding to the setting of the poise or poises, the inclined position of switch 98 can be adjusted so that the feeder motor circuit is open and the feeder stopped before the beams are actually balanced. The adjustment is accordingly made so that the additional material deposited in the hopper after the feeder motor circuit is opened, will balance the scale within the permissible limits.

In further explanation of the above, it will be assumed as an example that it is desired to weigh a batch of 658 pounds of cement, that the feeder roll 12 is operated at a speed of 28 R. P. M. This speed is sufficient, although relatively slow, to deposit about 75 pounds of cement after the circuits described are broken, due to the lag of the brake 97, the scale elements and associated switches. It is understood, of course, that the size of the apparatus would necessarily affect this example. The total quantity of cement thus to be compensated for being 75 pounds, it is necessary to stop the apparatus prior to the delivery of the final 75 pounds of the total batch of 658 pounds. As a tare beam of the type described will start to move when the batch is within 200 to 150 pounds of the desired 658 pound batch, the actual compensation to cause the suspended cement and that withdrawn by the roll due to the over-running is made by adjusting the angle of the tube 98 manually by trial and error, the operator actually weighing the batches under automatic control. The final adjustment of the tube is usually reached within five or six trials. With the example described above it will be seen that the motor 27 has been stopped when about 75 pounds less than the desired quantity has been deposited in the hopper 3.

Although the apparatus will normally come to balance exactly, it will be evident that due to the peculiar characteristics of pulverized material, a slight excess or deficiency of material in the hopper 3 may occur at times. In the mixing of concrete this permissible error should not vary more than 1% and to maintain the error factor well within these limits provision is made to prevent discharge through the gate 8 usually within limits of 5 pounds in the example noted above. This is controlled as follows: An "under" switch 105 and an "over" switch 106, mounted on the support 60 and operated by the tare beam, are connected in series with their terminals arranged oppositely in the same circuit, being tilted so that the circuit is completed through both tubes when the weight is within the allowable limits mentioned above, the circuit being completed through the feeder 80 of line 107 which terminates in the inner contact of the opening button 77. Movement of the push button switch 77 completes the circuit to line 76 through tube 74 to the feeder motor 27, this circuit being interlocked with the closing push-button switch 64 through lines 66 and 75. It will be recalled that simultaneously with the starting of the motor 27, the solenoid 68 is energized to release the brake 69 from the brake drum 70 of the motor 47 which drives the gate 8.

As the motor 47 drives the gate through speed reduction gearing, the operator can control the degree of opening of the gate by engaging the inner contacts of push-button switch 77 for short intervals until the full open position is reached. Further, when the discharge gate 8 has started to open, the stop 51 allows only the upper bank of three switches shown at the bottom of the diagram to move, the lower bank remaining stationary until the full open position has been reached, when they are moved by stop 50. Accordingly, the circuit through the tube 72 remains open; this circuit also including lines 73 and 108, the switch 109 and the line 110, which is an extension of the feeder 80. Accordingly, premature closing of the push-button will not reverse the motor 47 and thereby close the gate 8 before the entire batch has been discharged. The tube 109 in this circuit prevents premature opening of the gate by lying in the open position until the tare beam 54 tilts it to its closed position, the tare beam being in balance when the hopper is completely empty.

When the gate 8 is completely opened, the lower bank of tubes associated with it is tilted by the stop 50. This bank includes a tube 111 which completes the circuit through lines 112 and 76 to the opening button 77, this circuit including the vibrator 113 energized from the feeder 80 by branch line 114. The vibrator 113 is of any suitable commercial construction and is secured to the hopper 3 near the bottom. It is maintained in operation simply by the manual operation of holding the push-button switch 77 in closed position until the operator observes that the telltale 58 indicates the hopper to be completely empty.

When the tare beam 54 comes to balance, a circuit is closed through the switch 109 through lines 108 and 110, line 115 through tube 72 to line 73 through the opening push-button 77, thence across the extension 67 to line 116 through the magnet 117 of a reversing switch. This switch is intended for reversing the motor 47 to close the gate 8 through the following circuits: These include the lines 118, 119 and 120 to the winding 121 of the motor 47, which is single-phase, the line 66 to the closing push-button switch 64 being a feeder and is not affected by the reversing switch.

It will be obvious that when the tare beam is in balance, shaking or vibration of the apparatus would cause the tare beam to vibrate and accordingly cause the magnetic 3-pole switch 92' to "chatter", thereby causing the feeder motor 27 to be started and stopped rapidly. This is prevented by the tube 88 on the support 60, through which the circuit is broken immediately upon the initial movement of the tare beam toward its balance position.

In order to prevent the operator from starting motor 47 to close the discharge gate 8 before the hopper 3 is completely empty and the tare beam is in balance, it should be noted that tube 109 has a further function of completing a circuit through line 110 which is an extension of the feeder 80 through line 108, tube 72 of the lower bank through the closing button circuit 64, thus preventing the completion of the circuit through said push-button when the tare beam is out of balance.

When the gate 8 is opened, the tare beam 57 is forced out of balance by the effect of the solenoid 78, which raises the weigh beam 56 from the loop 55, the tare beam being thrown out of balance on the forward side, thereby breaking the circuit through tubes 106 and 105. These tubes being in the circuit of the opening push-button switch 77 control the opening of the gate 8 only, but when the gate has moved a short distance toward the open position the circuit through the tubes 106 and 105 is open and the circuit through the opening push-button 77 is open and the circuit through the opening push-button 77 is then completed through a tube 123 in the upper bank of three switches, this permitting the complete opening of the gate 8.

In order to permit the operator to reverse the direction of movement of the roll 12 of feeder 1, to discharge foreign material, if the latter should be trapped in a flute 13, when the roll is idle; movement of the 3-pole switch 63 to the opposite position permits this reversal.

The operation of the apparatus will be apparent from the foregoing description, but it is to be borne in mind that the function of the operator is merely to start the apparatus by moving push-button switch 64 to the inner pair of contacts to close the gate 8 and to establish by movement of the gate the various interlocking and control circuits including the starting of the feeder motor and that the operation of the parts continues until the desired weight has been deposited in the hopper 3 and the weigh beam is in balance. As soon as the feeder comes to rest and the weigh beam in balance within the limits referred to above, the operator can open the gate simply by moving push-button switch 77 to the inner pair of contacts and ultimately holding the switch in this position until the vibrator 113 has released all cement from the hopper and the tare beam has again returned to balance.

I claim:

1. An apparatus for withdrawing and weighing predetermined batches of bulk materials stored in bins, comprising the combination of a scale, a batch hopper suspended thereon, means for admitting material from storage into the hopper, the bottom of the hopper being provided with a discharge gate, electrically operated means including a motor for opening and closing the gate, a circuit for said motor and including a switch actuated by an element of the scale for closing the circuit to said motor for opening the gate when a predetermined weight of material has been deposited in said hopper, a second switch in said circuit and actuated by an element of the scale to keep the circuit open and the opening means inoperative to open the gate if material in excess of the predetermined weight is deposited in the hopper, and a third switch actuated by an element of the scale to close the circuit to said motor for closing the gate when the hopper is empty.

2. An apparatus for withdrawing and weighing predetermined batches of materials stored in bins, comprising the combination of a scale, a batch hopper suspended thereon, means for admitting material from storage into the hopper, the bottom of the hopper being provided with a gate, electrically operated means for opening and closing the gate, said means having an opening and closing circuit each including a push-button switch, a switch in the opening circuit actuated by an element of the scale when the latter comes to balance for closing the circuit to the closing push-button switch, and a switch in the closing circuit actuated by an element of said scale to maintain the closing circuit open until the hopper is empty.

3. An apparatus for withdrawing and weighing predetermined batches of materials stored in bins, comprising the combination of a scale, a batch hopper suspended thereon, means for admitting material from storage into the hopper, the bottom of the hopper being provided with a gate, electrically operated means for opening and closing the gate, said means having an opening and closing circuit each including a push-button switch, a switch in the opening circuit actuated by an element of the scale when the latter comes to balance for closing the circuit to the closing push-button switch, a switch in the closing circuit actuated by an element of said scale to maintain the closing circuit open until the hopper is empty, and additional switch means in said opening circuit likewise actuated by an element of the scale to render the opening circuit inoperative when the material deposited in the hopper exceeds or is less than the predetermined weight.

4. An apparatus for withdrawing and weighing predetermined batches of materials stored in bins, comprising the combination of a scale, a batch hopper suspended thereon, means for admitting material from storage into the hopper, the hopper being provided with a motor-driven discharge gate, a closing circuit including a manually operated push-button for closing the discharge gate, the said circuit including a switch actuated by a movable element of the scale when the hopper is in unbalanced position to complete the circuit whereby the gate can be closed only when the hopper is empty.

5. An apparatus for withdrawing and weighing predetermined batches of materials stored in bins, comprising the combination of a scale, a batch hopper suspended thereon, means for admitting material from storage into the hopper, the hopper being provided with a motor-driven discharge gate, a closing circuit including a manually operated push-button for closing the discharge gate, the said circuit including a switch actuated by an element of the scale to complete the circuit and close the gate when the hopper is empty, an opening circuit interconnected with said closing circuit, the opening circuit including a switch actuated by an element of the scale to maintain the circuit open until the desired weight of material has been deposited in the hopper.

6. An apparatus for withdrawing and weighing predetermined batches of materials stored in bins, comprising the combination of a scale, a batch hopper suspended thereon, means for admitting material from storage into the hopper, the hopper being provided with a motor-driven discharge gate, a closing circuit including a manually operated push-button for closing the discharge gate, the said circuit including a switch actuated by an element of the scale to complete the circuit and close the gate when the hopper is empty, an opening circuit interconnected with said closing circuit provided with a push-button, the opening circuit including a switch actuated by an element of the scale to maintain the circuit open until the desired weight of material has been deposited in the hopper and an additional switch in the opening circuit actuated by the initial closing movement of the gate, to prevent reopening the latter by movement of the push-button in the opening circuit.

7. An apparatus for withdrawing and weighing predetermined batches of bulk materials stored in bins, comprising the combination of a scale having weigh and tare beams, a batch hopper suspended from the scale, means for admitting material from storage into the hopper, the bottom of the hopper being provided with a motor-driven discharge gate, the closing circuit for said motor-driven gate including a manually operated push-button switch and a switch actuated by the movement of the tare beam when the latter comes to balance to complete the circuit to close the gate, and an opening circuit for said gate, including a second push-button switch and a switch actuated by the tare beam when the weigh beam comes to balance to complete the circuit through the corresponding push-button to open the gate.

8. An apparatus for withdrawing and weighing predetermined batches of materials stored in bins, comprising the combination of a scale having weigh and tare beams, a batch hopper suspended from the scale, a motor-driven feeder for withdrawing material from storage and delivering it to the hopper, a power circuit for the feeder motor, including a switch actuated by movement of the weigh beam through elements of the tare beam before the weigh beam comes to actual balance to open the circuit to stop the feeder motor before the weigh beam comes to balance to compensate for material in suspension between the feeder and the hopper, the hopper having an electrically operated discharge gate, manually operable push-button switches and switches operated by movement of the gate to establish circuits through the manually operated push-button switches to close the gate and complete the feeder motor circuit and also to open the feeder motor circuit and to open the gate when the predetermined quantity of material has been deposited in the hopper.

In testimony whereof I affix my signature.

JOSEPH H. MORROW.